United States Patent
DiCarlo et al.

(10) Patent No.: US 7,324,703 B2
(45) Date of Patent: Jan. 29, 2008

(54) METHOD AND SYSTEM FOR CORRECTING THE EFFECT OF NON-UNIFORM ILLUMINATION

(75) Inventors: Jeffrey M. DiCarlo, Stanford, CA (US); Miheer Bhachech, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 635 days.

(21) Appl. No.: 10/982,255

(22) Filed: Nov. 5, 2004

(65) Prior Publication Data

US 2006/0098894 A1 May 11, 2006

(51) Int. Cl.
*G06K 9/40* (2006.01)
(52) U.S. Cl. .................................... 382/274; 382/263
(58) Field of Classification Search ............... 382/263, 382/274, 275, 312; 348/68, 744; 359/227, 359/707, 738; 356/3
See application file for complete search history.

(56) References Cited

U.S. PATENT DOCUMENTS

| | | | | |
|---|---|---|---|---|
| 4,216,494 A * | 8/1980 | Ohshima et al. | ............ | 348/259 |
| 5,809,165 A * | 9/1998 | Massen | ..................... | 382/168 |
| 5,878,152 A * | 3/1999 | Sussman | ..................... | 382/106 |
| 5,897,760 A * | 4/1999 | Heffelfinger et al. | ....... | 204/612 |
| 6,025,905 A * | 2/2000 | Sussman | ..................... | 356/3.01 |
| 6,456,339 B1 * | 9/2002 | Surati et al. | ................ | 348/745 |
| 6,583,940 B2 * | 6/2003 | Nishikawa et al. | ......... | 359/738 |

* cited by examiner

*Primary Examiner*—Kanjibhai Patel

(57) ABSTRACT

A system and a method are provided for correcting the effect of non-uniform illumination on a reproduced image of a 2-D object. An image of a reference card in an illuminated setting is captured by an image capturing device. A 2-D object is placed in the same illuminated setting and the image of the object is captured. Next, a smoothing function for the reference card image is generated. The smoothing function is used to generate a smoothed reference card image. The smoothed reference card image is processed to compute inverse correction values, which are mathematical inverse of the pixel values in the smoothed reference card image. A pixel-by-pixel correction is then applied to the captured image of the 2-D object using the inverse correction values.

14 Claims, 2 Drawing Sheets

METHOD AND SYSTEM FOR CORRECTING THE EFFECT OF NON-UNIFORM ILLUMINATION

BACKGROUND

The present invention relates generally to the field of image processing.

Fine art reproduction has been an area of commercial interest. Two-dimensional (2-D) original artworks, such as paintings, drawings and posters, can be reproduced as printed reproduction by photographing the artworks under a lighting set-up, and printing the captured images on poster-size media. The faithfulness of the reproduction is affected by several factors, one of which is the illumination on the objects being photographed. When a 2-D object is photographed by a camera under non-uniform illumination, the captured image of the object contains regions that are unnaturally brighter or darker than other regions. In conventional photography, a lot of time is spent in trying to get the lighting uniform by manually adjusting the lighting in order to achieve uniform illumination. This technique is very time consuming, inaccurate and demanding. For very large, museum-size paintings, it is practically impossible to achieve perfectly uniform illumination on the paintings.

There remains a need for a simple method of correcting the non-uniform illumination characteristic in reproduced images of 2-D objects without requiring the illumination on the objects to be uniform.

SUMMARY

A system and a method are provided for correcting the effect of non-uniform illumination on a reproduced image of a 2-D object. An image of a reference card in an illuminated setting is captured by an image capturing device. A 2-D object is placed in the same illuminated setting and the image of the object is captured. Next, a smoothing function for the reference card image is generated. The smoothing function is used to generate a smoothed reference card image. The smoothed reference card image is processed to compute inverse correction values, which are mathematical inverse of the pixel values in the smoothed reference card image. A pixel-by-pixel correction is then applied to the captured image of the 2-D object using the inverse correction values.

The objects, feature and advantages of the present disclosure will become apparent from the detailed description when read in conjunction with the drawings.

DETAILED DESCRIPTION

Figure 1:
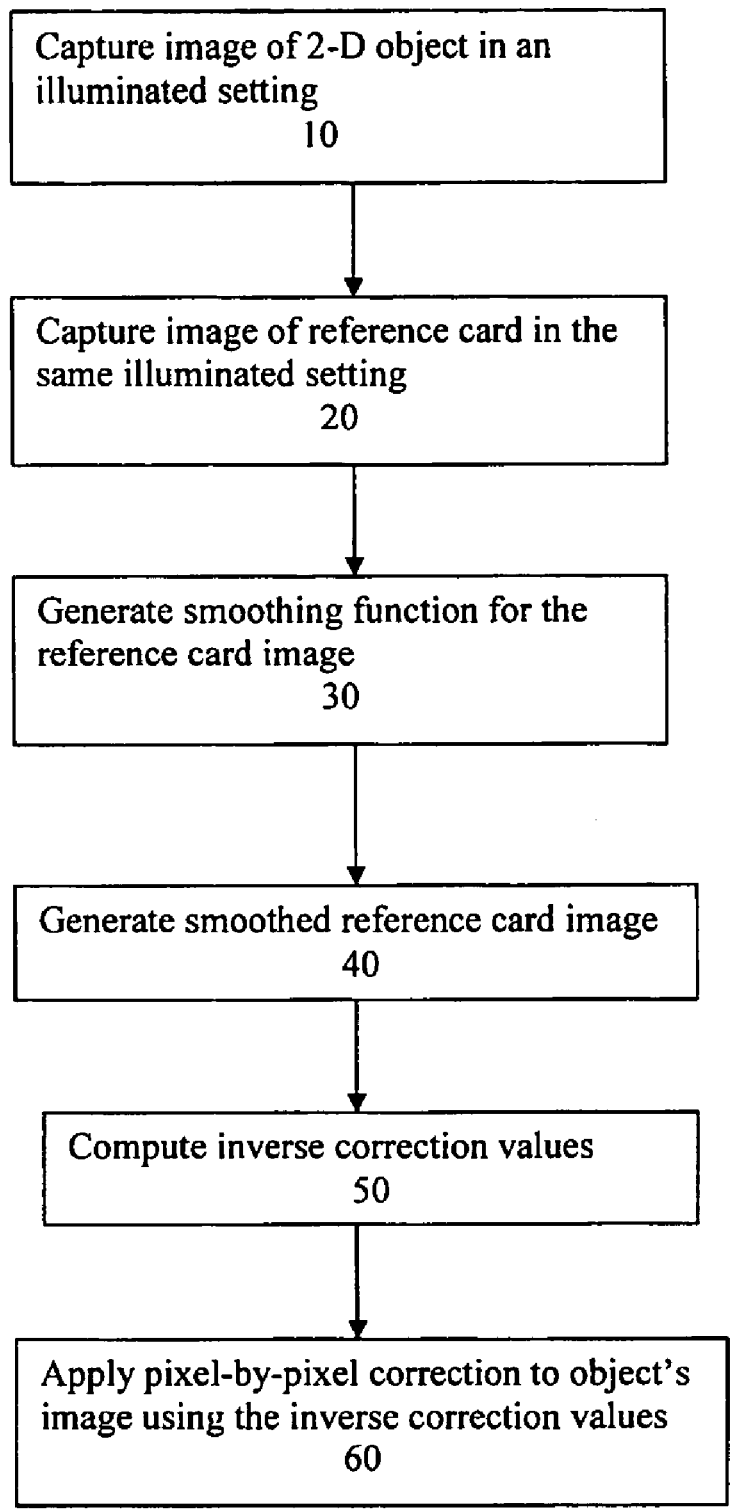
FIG. 1 shows the basic steps of a method for correcting the effect of non-uniform illumination in accordance to an embodiment.

FIG. 1 illustrates a method for correcting the effect of non-uniform illumination on reproduced images of 2-D objects. The 2-D objects include paintings, drawings, posters, other 2-D artworks, and documents. This method eliminates the need for uniform illumination. At step 10, a 2-D object is placed in an illuminated setting and the object's image is captured by an image capturing device, e.g. a digital camera. At step 20, a reference card is placed in the same illuminated setting and an image of the reference card is captured. Alternatively, steps 10 and 20 could be reversed so that the image of the reference card can be captured before capturing the image of the 2-D object in the same illuminated setting. In one embodiment, the reference card is a uniformly colored white surface that is the same size as the 2-D object. Examples of a reference card can include a stretched canvas, a poster board, and a wall surface. A white surface or board has been found to be effective as a reference card. As an example, if the 2-D object is a large painting hung on a white wall, the white wall could be used as a reference card.

In one embodiment, the method can be optimized by using a reference card essentially having a perfectly smooth and uniform surface. This, however, is difficult to achieve in real imaging situations. Hence, in another embodiment, the reference card may contain defects, smudges and/or blemishes from constant handling and the materials used for making the reference cards are often not very uniform. These blemishes in the reference card as well as photon noise and dark noise may produce a noisy reference image. Thus, in this embodiment, it may be advantageous to smooth out the captured reference card image. This is accomplished by generating a smoothing function based on the reference card image at step 30, then generating a smoothed reference card image using this smoothing function at step 40. One of the advantages of having steps 30 and 40 is that it is not necessary to have a perfectly uniform and smooth (i.e., defect free) reference card. The reference card may have holes, missing sections or may be slightly smaller than the 2D image and the smoothing function will "fill in" the missing portion. Furthermore, the smoothed reference card image does not have to be at the same resolution as the originally captured reference card image. This can dramatically reduce the capture time for acquiring the reference card image.

In one embodiment, the smoothing function is a polynomial function that fits to the data of the captured reference card image, but any smoothing function can be used. A generic Nth order polynomial function that is suitable for smoothing three-channel reference card image is defined below:

$$\begin{bmatrix} r' \\ g' \\ b' \end{bmatrix} = s(x, y) = \sum_{k=0}^{(N-1)} \sum_{l=0}^{(N-k-1)} c_{l,k} x^l y^k = \sum_{k=0}^{(N-1)} \sum_{l=0}^{(N-k-1)} \begin{bmatrix} c^r_{l,k} \\ c^g_{l,k} \\ c^b_{l,k} \end{bmatrix} x^l y^k$$

Here, $$\begin{bmatrix} r' \\ g' \\ b' \end{bmatrix}$$

are the smoothed reflectance image R,G,B values, $$\begin{bmatrix} c_{L,k}^r \\ c_{L,k}^g \\ c_{L,k}^b \end{bmatrix}$$

are coefficients that define the polynomial function (determined using the captured reference card image), x, y are the image locations of a pixel in the captured reference card image, and N is the order of the polynomial.

To illustrate how the coefficients of the polynomial function are determined from the captured reference card image, the following definitions are necessary. Let:

m=number of pixels of the captured object's image,
n=number of pixels of the captured reference card image (n does not have to be equal to m),
$r_i$, $g_i$, $b_i$=RGB data for pixel i of the captured reference card image,
$r'_i$, $g'_i$, $b'_i$=RGB data for pixel i of the smoothed reference card image obtained after applying polynomial surface fitting,
$x_i$, $y_i$=location of pixel i in the captured reference card image (for i=1, 2, 3 . . . n),
$x'_i$, $y'_i$=location of pixel i in the captured object's image (for i=1, 2, 3 . . . m).

Furthermore, assume that a 5th order polynomial function is appropriate for representing the lighting on the artwork. With these assumptions, the smoothing polynomial function can be written as:

$$s(x,y)=c_{0,0}+c_{1,0}x+c_{2,0}x^2+c_{3,0}x^3+c_{4,0}x^4+c_{0,1}y+c_{1,1}xy+c_{2,1}x^2y+c_{3,1}x^3y+c_{0,2}y^2+c_{1,2}xy^2+c_{2,2}x^2y^2+c_{0,3}y^3+c_{1,3}xy^3+c_{0,4}y^4$$

The coefficients $c_{0,0}$, $c_{1,0}$ . . . $c_{0,4}$ of the polynomial are computed from the known r, g, b values of each pixel and x and y location of each pixel. To compute the coefficients, the $5^{th}$ order polynomial equation can be written in matrix form as:

$$\begin{bmatrix} r_1 & g_1 & b_1 \\ r_2 & g_2 & b_2 \\ \vdots & \vdots & \vdots \\ r_n & g_n & b_n \end{bmatrix} = \begin{bmatrix} 1 & x_1 & x_1^2 & \cdots & x_1 y_1^3 & y_1^4 \\ 1 & x_2 & x_2^2 & \cdots & x_2 y_2^3 & y_2^4 \\ \vdots & \vdots & \vdots & \ddots & \vdots & \vdots \\ 1 & x_n & x_n^2 & \cdots & x_n y_n^3 & y_n^4 \end{bmatrix} \begin{bmatrix} c_{0,0}^r & c_{0,0}^g & c_{0,0}^b \\ c_{1,0}^r & c_{1,0}^g & c_{1,0}^b \\ c_{2,0}^r & c_{2,0}^g & c_{2,0}^b \\ \vdots & \vdots & \vdots \\ c_{1,3}^r & c_{1,3}^g & c_{1,3}^b \\ c_{0,4}^r & c_{0,4}^g & c_{0,4}^b \end{bmatrix}$$

In this form, the standard pseudo-inverse can be used to solve for the matrix of polynomial coefficents. Using the computed coefficients, a smoothed reference card image can be generated using the polynomial function at the same resolution as the originally captured reference card image.

Those skilled in the art will recognize that other techniques for solving for the coefficients in the polynomial equation are possible. For example, QR decomposition and SVD decomposition are two other inversion techniques that could be applied.

Referring again to FIG. 1, inverse correction values are computed from the smoothed reference card image at step 50. The inverse correction values are the mathematical inverse of the pixel values in the smoothed reference card image. Let $r_a$, $g_a$, $b_a$ be the pixel values of the captured object's image at some location and $r'_i$, $g'_i$, $b'_i$ be the pixel values of the smoothed reference card image at the same location. The inverse correction value for this location ($m^r$, $m^g$, $m^b$) is defined by $$m^r=1/r'_i \quad m^g=1/g'_i \quad m^b=1/b'_i$$

At step 60, a pixel-by-pixel correction is applied to the captured object's image using the inverse correction values computed from step 50. In one embodiment, this correction is done by multiplying each pixel value of the captured object's image with the corresponding inverse correction value as shown by the following expression:

$$R_a=r_a \times m^r \quad G_a=g_a \times m^g \quad B_a=b_a \times m^b$$

Where $R_a$, $G_a$, $B_a$, is the red, green and blue pixel values of the captured object's image after correction at the same pixel location.

Figure 2:
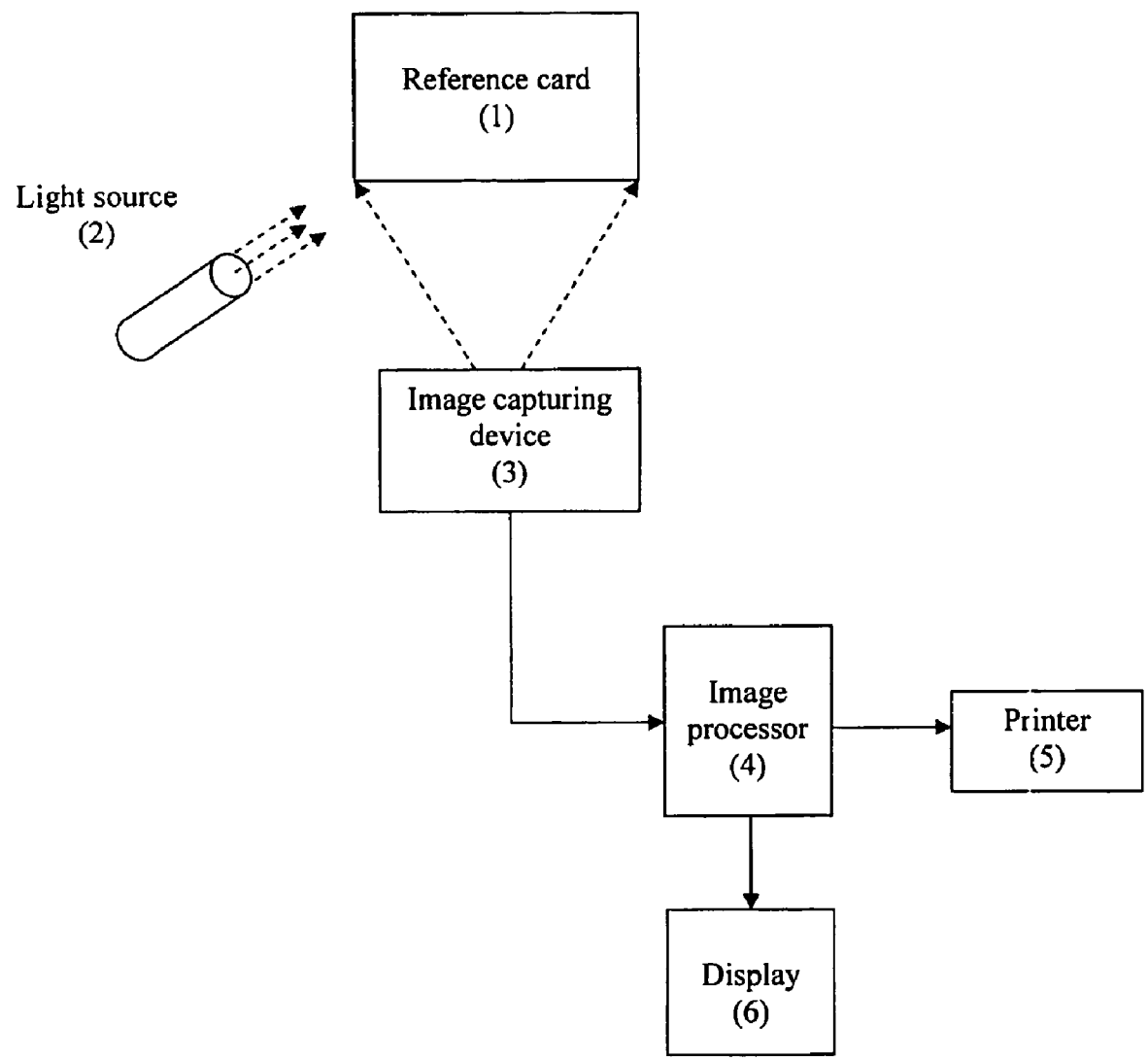
FIG. 2 shows a schematic diagram of a system for correcting the effect of non-uniform illumination on a 2-D object in accordance to an embodiment.

Referring to FIG. 2, an embodiment of a system for carrying out the method described in FIG. 1 includes a reference card 1, a light source 2, an image capturing device 3, and an image processor 4. The light source 2 may be a lamp or another display illuminant. It is preferred that the light source does not produce specular highlights or harsh shadows. Although only one light source is shown in FIG. 2, two or more light sources may be arranged so as to project more balanced lighting onto the 2-D object. The image capturing device may be a camera, for example, a digital camera. The captured images of the reference card and the object are processed by the image processor 4 to correct the effect of non-uniform illumination. The image processor 4 contains a program storage medium embodying a program that performs the steps of: generating a smoothing function for the reference image; generating a smoothed reference image using the smoothing function; computing inverse correction values from the smoothed reference card image; and applying pixel-by-pixel correction to the object's image using the inverse correction values. The image processor 4 may be contained fully or in part within the image capturing device 3 or may be completely separate from the image capturing device 3. It will be understood by one skilled in the art that the processing steps done by the image processor 4 may be performed using hardware, e.g. specialized ASIC, software, or any combination thereof.

After the illumination non-uniformity in the object's image is corrected, the object's image may be color corrected and output to a printer 5 or a display 6. It will be understood by one skilled in the art that other output devices are also possible.

It is intended that the embodiments contained in the above description and shown in the accompanying drawings are illustrative and not limiting. It will be clear to those skilled in the art that modifications may be made to the embodiments without departing from the scope the invention as defined by the appended claims.

What is claimed is:

1. A method for correcting the effect of non-uniform illumination on a reproduced image of a two-dimensional object, said method comprising:
   capturing an image of a reference card in an illuminated setting using an image capturing device;
   capturing an image of a two-dimensional object placed in the same illuminated setting;
   generating a smoothing function for the captured reference card image;
   using the smoothing function to generate a smoothed reference card image;

computing inverse correction values, which are mathematical inverse of the pixel values in the smoothed reference card image; and applying a pixel-by-pixel correction to the captured image of the two-dimensional object using the inverse correction values.

2. The method of claim 1, wherein the smoothing function is a polynomial surface fitting of the captured reference card image.

3. The method of claim 2, wherein the polynomial surface is represented by $$\begin{bmatrix} r' \\ g' \\ b' \end{bmatrix} = s(x,y) = \sum_{k=0}^{(N-1)} \sum_{l=0}^{(N-k-1)} c_{l,k} x^l y^k = \sum_{k=0}^{(N-1)} \sum_{l=0}^{(N-k-1)} \begin{bmatrix} c_{l,k}^r \\ c_{l,k}^g \\ c_{l,k}^b \end{bmatrix} x^l y^k.$$

4. The method of claim 1, wherein the reference card is uniformly colored.

5. The method of claim 4, wherein the reference card is white.

6. The method of claim 4, wherein the reference card has substantially the same size as the two-dimensional object.

7. The method of claim 4, wherein the two dimensional object is a painting or another two-dimensional artwork.

8. The method of claim 1, wherein the pixel-by-pixel correction comprises multiplying each pixel value in the captured image of the two-dimensional object with a corresponding inverse correction value.

9. A computer-readable recording medium embodying a program of instructions executable by a computer to perform a method for correcting the effect of non-uniform illumination on a reproduced image of a two-dimensional object, said method comprising:

receiving an input digital image of a reference card in an illuminated setting;

receiving an input digital image of a two-dimensional object placed in the same illuminated setting;

generating a smoothing function for the image of the reference card;

using the smoothing function to generate a smoothed reference card image;

computing inverse correction values, which are mathematical inverse of the pixel values in the smoothed reference card image; and applying a pixel-by-pixel correction to the image of the two-dimensional object using the inverse correction values.

10. The computer-readable recording medium of claim 9, wherein the smoothing function is a polynomial surface fitting of the captured reference card image represented by $$\begin{bmatrix} r' \\ g' \\ b' \end{bmatrix} = s(x,y) = \sum_{k=0}^{(N-1)} \sum_{l=0}^{(N-k-1)} c_{l,k} x^l y^k = \sum_{k=0}^{(N-1)} \sum_{l=0}^{(N-k-1)} \begin{bmatrix} c_{l,k}^r \\ c_{l,k}^g \\ c_{l,k}^b \end{bmatrix} x^l y^k.$$

11. A system for generating uniformly illuminated images of two-dimensional objects, said system comprising:

means for illuminating a two-dimensional object;

a reference card;

means for capturing an image of the reference card and an image of the two-dimensional object; and means for processing the captured images, said means for processing being programmed to perform a method comprising:

(a) generating a smoothing function for the captured reference card image;

(b) generating a smoothed reference card image using the smoothing function;

(c) computing the mathematical inverse of the pixel values in the smoothed reference card image in order to obtain inverse correction values; and (d) applying a pixel-by-pixel correction to the captured image of the two-dimensional object using the inverse correction values.

12. The system of claim 11 further comprising means for printing the image of the two-dimensional object after pixel-by-pixel correction.

13. A system for generating uniformly illuminated images of two-dimensional objects, said system comprising:

at least one light source for illuminating a two-dimensional object;

a reference card;

an image capturing device operable to capture an image of the reference card and an image of the two-dimensional object; and an image processor for processing the captured images, said image processor being programmed to perform a method comprising:

(e) generating a smoothing function for the captured reference card image;

(f) generating a smoothed reference card image using the smoothing function;

(g) computing the mathematical inverse of the pixel values in the smoothed reference card image in order to obtain inverse correction values; and (h) applying a pixel-by-pixel correction to the captured image of the two-dimensional object using the inverse correction values.

14. The system of claim 13 further comprising a printer operable to print the image of the two-dimensional object after pixel-by-pixel correction.

* * * * *